(12) United States Patent
Zhu et al.

(10) Patent No.: US 12,316,828 B2
(45) Date of Patent: May 27, 2025

(54) AUTOMATIC TIME DELAY AND INTEGRATION (TDI) MASK INSPECTION SYSTEM CALIBRATION

(71) Applicant: Taiwan Semiconductor Manufacturing Company, Hsinchu (TW)

(72) Inventors: Pei-Yu Zhu, Hsinchu (TW); Yen-Hsun Chen, Taipei (TW); Shang-Chieh Chien, New Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 68 days.

(21) Appl. No.: 18/199,109

(22) Filed: May 18, 2023

(65) Prior Publication Data

US 2024/0388688 A1    Nov. 21, 2024

(51) Int. Cl.
*H04N 23/695* (2023.01)
*G06T 7/00* (2017.01)
*H04N 17/00* (2006.01)

(52) U.S. Cl.
CPC ........... *H04N 17/002* (2013.01); *G06T 7/001* (2013.01); *H04N 23/695* (2023.01); *G06T 2207/30148* (2013.01)

(58) Field of Classification Search
None
See application file for complete search history.

(56) References Cited

U.S. PATENT DOCUMENTS

| 2008/0117518 | A1* | 5/2008 | Wang | G02B 21/0032 |
| | | | | 359/641 |
| 2009/0208876 | A1* | 8/2009 | Hsu | G02B 6/02152 |
| | | | | 430/321 |
| 2009/0224151 | A1* | 9/2009 | Hatakeyama | H01J 37/261 |
| | | | | 250/307 |
| 2015/0260659 | A1* | 9/2015 | Chuang | H01L 27/14643 |
| | | | | 257/292 |
| 2019/0313010 | A1* | 10/2019 | Vounckx | H04N 23/69 |
| 2024/0037789 | A1* | 2/2024 | Nakamura | G06T 7/74 |

* cited by examiner

*Primary Examiner* — Eileen M Adams
(74) *Attorney, Agent, or Firm* — Lippes Mathias LLP (57) ABSTRACT

A mask inspection system employs TDI imaging. The mask inspection system is calibrated by iteratively repeating, until a stopping criterion is met: (i) simultaneously acquiring first and second TDI images using respective first and second TDI image sensors of the mask inspection system, the first and second TDI image sensors being configured to acquire the respective first and second TDI images with light of mutually orthogonal polarizations, and (ii) automatically adjusting a position of the second TDI image sensor using an electronic controller that receives a feedback error signal indicative of the shift of the second TDI image respective to the first TDI image along the shift direction. The adjusting may utilize an electronic controller that controls the motor based on a received feedback error signal indicative of the shift of the second TDI image respective to the first TDI image along the shift direction.

20 Claims, 5 Drawing Sheets

AUTOMATIC TIME DELAY AND INTEGRATION (TDI) MASK INSPECTION SYSTEM CALIBRATION

BACKGROUND

The following relates to the mask inspection arts and related arts.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A photolithography system optically transfers a pattern on a mask to a photoresist layer previously formed on the surface of a semiconductor wafer, thereby producing a latent image in the photoresist layer. Subsequently the latent image is developed and processed, for example by selective etching of the developed photoresist to form openings in the photoresist corresponding to features of the pattern on the photomask. The semiconductor wafer then is processed via the openings, for example by depositing a material in the openings, or etching underlying semiconductor material exposed by the openings in the photoresist. For small features, extreme ultraviolet (EUV) photolithography may be performed, for example with EUV light having a wavelength of 13.5 nm in one nonlimiting illustrative example, or deep ultraviolet (DUV) lithography at a longer ultraviolet wavelength.

A photolithography mask is a reusable component that is used for multiple wafer exposures. During such repeated use, the mask can accumulate various defects such as particles on the surface of the mask. By way of one nonlimiting illustrative example, in EUV lithography a laser-produced plasma (LPP) light source may be used to generate the EUV light that is then reflected off the mask onto the photoresist. The LPP light source vaporizes tin droplets with a laser during EUV light production. While precautions are taken, such as using a protective pellicle, this process can nonetheless result in tin particulates from the LPP light source depositing onto the EUV mask. Similar types of contamination can occur with other types of masks such as deep ultraviolet (DUV) masks, which may operate in transmissive mode (i.e. the DUV light passes through the DUV mask). The impact of particles or other mask defects on the lithography process depends on numerous factors such as the particle size compared with the critical dimension (CD) of the features being printed, optical properties of the particles at the operating photolithography wavelength, localized defect density, defect location on the mask, the type of semiconductor wafer processing being performed in conjunction with the lithography, and/or so forth.

A mask inspection system is used to inspect a mask to detect such mask defects. The mask inspection system acquires an image of the mask and compares the image with a reference image, such as a reference image of the mask prior to its first use. The comparison is done by automated digital image processing, and possible mask defects are identified as differences between the acquired image and the reference image. Suitable remedial actions can include continuing to use the mask if the mask defects are likely to have negligible impact on the semiconductor processing workflow, or cleaning the mask, or discarding the mask if the defects are problematic and irreparable.

Mask inspection to detect small mask defects of concern in EUV or DUV lithography is challenging. To meet this challenge, a mask inspection system may employ time delay and integration (TDI) imaging to advantageously acquire an image of the mask with high spatial resolution. In some TDI image sensor designs, the spatial resolution of the image acquired by the TDI image sensor can exceed the resolution of the gating infrastructure of the TDI image sensor itself. To further enhance the capability of the TDI mask inspection system to detect mask defects, two TDI images may be acquired using a beam splitter and two TDI image sensors that acquire the two TDI images with orthogonal light polarizations. This dual-polarization imaging improves detection of small particles or other mask defects on the mask surface. However, for this approach to be effective, the two TDI images of orthogonal polarizations should be precisely aligned with each other, as TDI images are acquired with the mask moving to implement the time delay and integration image acquisition. Any rotation or shift between the images acquired by the two TDI image sensors of orthogonal polarizations will result in a spatial mismatch between the two images, which in turn has an adverse impact on the mask defect detection image processing analysis. A calibration process is therefore performed. To this end, the TDI image sensors are equipped with manual set screws to adjust the positions of the two TDI image sensors. This calibration process is tedious, as it is an iterative process in which the user makes a set screw adjustment. Then, calibration images are acquired using the two image sensors and compared. The user then further adjusts the set screw based on the comparison, and this process is repeated until the images are aligned to within specification. It is not uncommon for a calibration performed after replacing a TDI image sensor to take as long as eight hours. Moreover, as the mask inspection system is a precision instrument, accessing and adjusting the set screw during this lengthy calibration process can result in inadvertent contact with and damage to other parts of the mask inspection system. Still further, this type of trial-and-error calibration process can have low accuracy, as in each iteration the user visually interprets the image comparison data to estimate how much to adjust the set screw.

In embodiments disclosed herein, the calibration process of a mask inspection system that employs TDI imaging is wholly or partially automated. This substantially reduces the calibration time, increases accuracy of the calibration, and avoids the potential for inadvertent damage to components of the mask inspection system.

Figure 1:
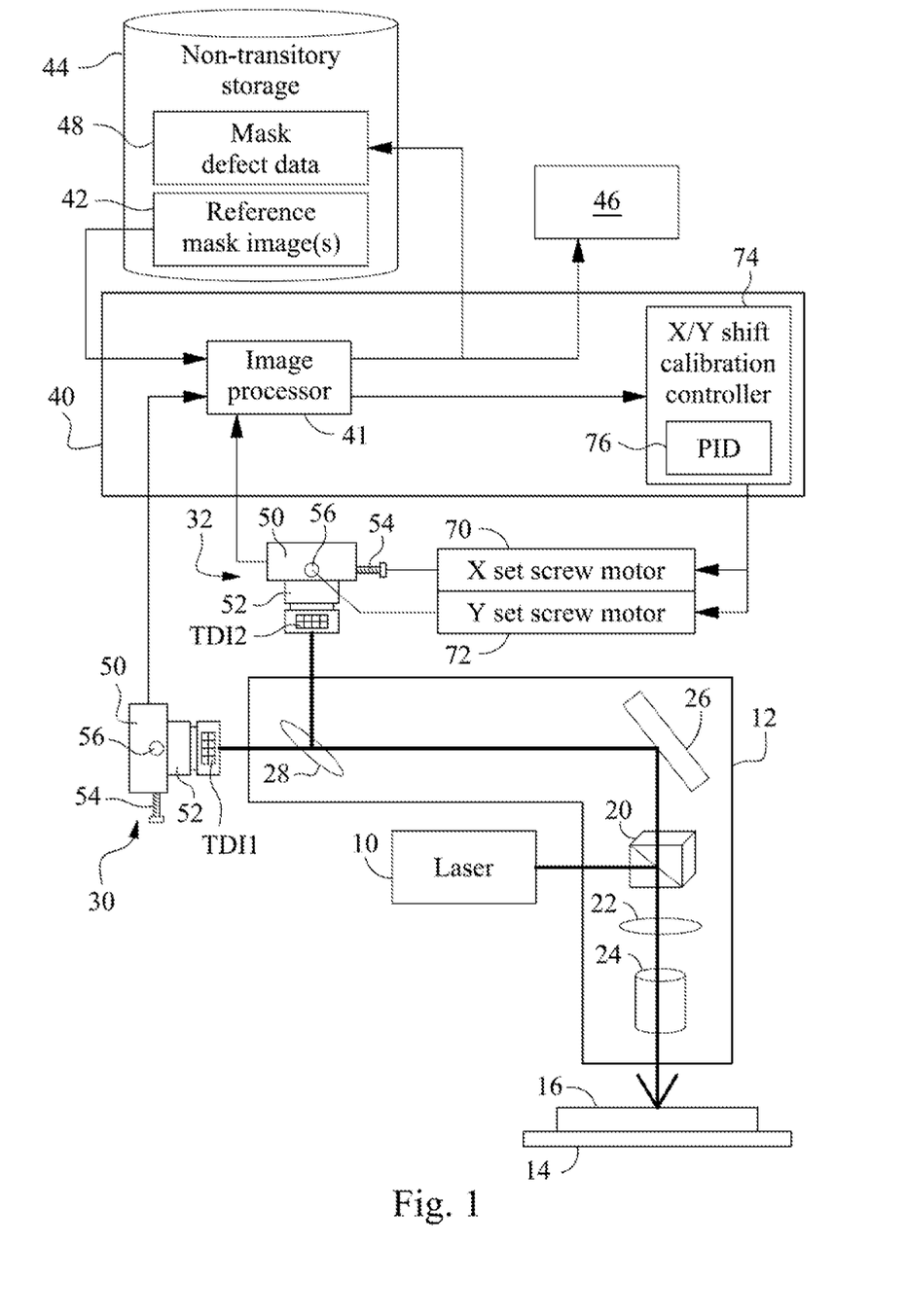
FIG. 1 diagrammatically illustrates a time delay and integration (TDI) mask inspection system including automatic calibration of X and Y shifts.

With reference to FIG. 1, a TDI mask inspection system is described which includes automatic calibration of X and Y shifts. The mask inspection system includes a light source 10 such as an illustrative laser 10, or a light emitting diode (LED) with collimating optics, or so forth. The light source 10 emits light at a wavelength effective to perform the mask inspection. In some embodiments the TDI mask inspection system is an actinic mask inspection system in which the light source 10 emits light at the same wavelength as that used when performing photolithography using the mask. In some embodiments, the TDI mask inspection system uses a different (e.g. longer) wavelength than that used when performing photolithography using the mask. As one nonlimiting illustrative example, the light source 10 for inspecting an EUV mask may be a laser light source emitting the light at 213 nm. In some embodiments, the use of TDI imaging in the mask inspection system of FIG. 1 advantageously provides improved spatial resolution to facilitate mask inspection at a longer wavelength than that used in lithography performed using the inspected mask.

An optical train 12 is provided to direct the light from the light source 10 to a translation stage 14 on which a mask 16 may be mounted for inspection. To perform the time delay and integration imaging, the translation stage is configured to translate the mask 16 laterally, e.g. in an X and/or Y direction. The illustrative optical train 12 includes a beam splitter 20 that re-directs light emitted by the light source 10 into a lens 22 and thence into an objective 24 which focuses the light onto a mask 16 mounted on the translation stage 14. The illustrative mask inspection system of FIG. 1 is designed to inspect a reflective mask, such as an EUV mask which is typically a reflective mask. Hence, the light focused onto the mask 16 by the objective 24 reflects back through the objective 24, the lens 22, and the beam splitter 20, which passes at least a portion of the reflected light to a mirror 26 which re-directs the reflected light to a second beam splitter 28 which directs one portion of the light to a first TDI image sensor TDI1 of a first TDI image sensor assembly 30, and another portion of the light to a second TDI image sensor TDI2 of a second TDI image sensor assembly 32.

The two TDI image sensors TDI1 and TDI2 acquire two respective TDI images with orthogonal light polarizations. This dual-polarization imaging improves detection of small particles or other mask defects on the mask surface. As one example, the two orthogonal polarizations can be two orthogonal linear polarizations. For descriptive purposes herein, first TDI image sensor TDI1 acquires an image with linearly polarized light having an X polarization, while the second TDI image sensor TDI2 acquires an image with linearly polarized light having an orthogonal Y polarization. In other embodiments, these polarizations may be switched, or other orthogonal polarizations could be employed, e.g. one TDI image sensor could acquire an image with linear polarization at a +45° orientation and the other TDI image sensor could acquire an image with linear polarization at a −45° orientation, as a further nonlimiting illustrative example.

To configure the two TDI image sensors TDI1 and TDI2 to acquire two respective TDI images with illustrative respective orthogonal X and Y light polarizations, various approaches can be used. In one approach, the first TDI image sensor assembly 30 could include a linear polarizer (not shown) disposed in front of the first TDI image sensor TDI1 to provide X polarization of the light detected by the first TDI image sensor TDI1; and similarly the second TDI image sensor assembly 32 could include a linear polarizer (not shown) disposed in front of the second TDI image sensor TDI2 to provide Y polarization of the light detected by the second TDI image sensor TDI2. In another approach, the second beam splitter 28 which directs one portion of the light to the first TDI image sensor TDI1 and another portion of the light to the second TDI image sensor TDI2 could be a polarizing beam splitter (PBS) oriented so that the portion of the light directed to the first TDI image sensor TDI1 is X-polarized light and the portion of the light directed to the second TDI image sensor TDI2 is Y-polarized light. Use of a PBS advantageously can provide higher light throughput. These are merely nonlimiting illustrative examples.

It will also be appreciated that the illustrative optical train 12 of FIG. 1 is a nonlimiting example, and that numerous other optical train configurations can be employed to achieve the purpose of directing light from the light source 10 onto the mask 16 and directing X polarized light from the mask 16 to the first TDI image sensor TDI1 and Y polarized light from the mask 16 to the second TDI image sensor TDI2. Moreover, while the illustrative mask inspection system of FIG. 1 is configured to inspect a reflective mask 16, in other embodiments the mask inspection system could be configured to inspect a light-transmissive mask.

With continuing reference to FIG. 1, during inspection of the mask 16 a first TDI inspection image is acquired of the mask 16 using the first TDI image sensor TDI1 while the mask 16 is being moved by the translation stage 14, and simultaneously a second TDI inspection image is acquired of the moving mask using the second TDI image sensor TDI2. The first TDI inspection image acquired using the first TDI image sensor TDI1 is acquired with light of a first (e.g. X) polarization, while the second TDI inspection image acquired using the second TDI image sensor TDI2 is acquired with light of a second (e.g. Y) polarization that is orthogonal to the first polarization. A hardware (i.e. electronic) processor 40 receives the first TDI image with the first (e.g. X) polarization and the second TDI image with the orthogonal second (e.g. Y) polarization, and also receives a reference mask image (or reference mask images) 42 from a non-transitory storage 44. The non-transitory storage 44 may, for example, comprise a hard disk drive or other magnetic storage, a solid state drive (SSD) or other electronic storage, an optical disk or other optical storage, various combinations thereof, or so forth. The electronic processor 40 is programmed to implement an image processor 41 that analyzes the first and second mask inspection images to detect mask defects of the mask 16 undergoing inspection by comparing the first and second mask inspection images with the reference mask image(s) 42. For example, the reference mask image(s) 42 could comprise two reference images with X polarization and Y polarization respectively, acquired using the first and second TDI image sensors TDI1 and TDI2 before the mask 16 had been first used in photolithography. Hence, the reference mask image(s) 42 are expected to be substantially defect-free since they were acquired before the mask 16 was exposed to the photolithography environment or otherwise utilized. Accordingly, any differences between the first and second mask inspection images and the corresponding reference mask images 42 are likely attributable to mask defects. The use of both X and Y polarization images is advantageous as some types of particles or other types of mask defects may have low contrast in one polarization image and stronger contrast in the other polarization image, depending on how the mask defect interacts with the light. The resulting identified mask defects may be presented on a display 46, and/or stored in the non-transitory storage 44 as mask defect data 48. In one nonlimiting example, the first and second mask inspection images are displayed side-by-side on the display 46 with the identified mask defects identified by highlighting or other visual indications. Alternatively, the first and second mask inspection images could be displayed as a single fused image with the mask defects highlighted. These are merely nonlimiting illustrative examples.

To provide good image quality and thus the high sensitivity in detecting mask defects, the TDI imaging performed by the TDI mask inspection system of FIG. 1 should be well calibrated. For optimal image quality, the time delay and integration imaging should be performed with the movement of the mask 16 by the translation stage 14 precisely aligned rotationally with the X- and Y-directions of the TDI image sensors TDI1 and TDI2. Additionally, the first and second mask inspection images should be precisely aligned in both X and Y directions. Put another way, any X shift in the X direction between the first and second mask inspection images should be within specification, and likewise any Y shift in the Y direction between the first and second mask inspection images should be within specification. In some embodiments, the specification is that the shift of the second TDI image acquired by the second TDI image sensor TDI2 respective to the first TDI image acquired by the first TDI image sensor TDI1 along the shift direction is less than the pixel size along the shift direction of the pixelated first and second images.

Figure 2:
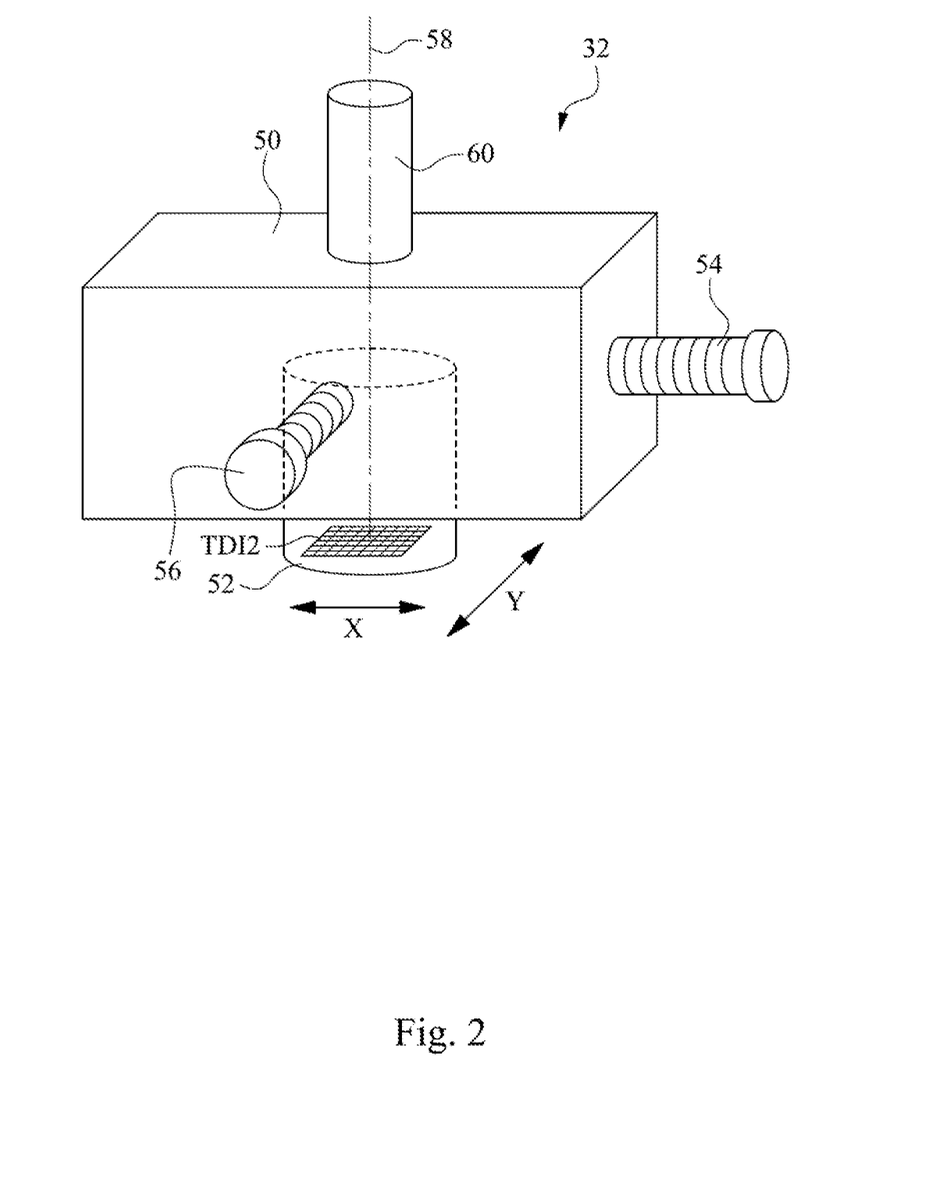
FIG. 2 diagrammatically illustrates a perspective view of a TDI image sensor assembly including an image sensor whose position is adjustable by set screws.

With further reference now to FIG. 2, the TDI image sensor assemblies 30 and 32 are described in more detail. FIG. 2 illustrates a diagrammatic perspective view of the second TDI image sensor assembly 32, but the first TDI image sensor assembly 30 may have the same structural components as those depicted in FIG. 2 for the second TDI image sensor assembly 32. Referring now to FIG. 2, the diagrammatically illustrated second TDI image sensor assembly 32 includes a housing 50 on or within which is mounted the second TDI image sensor TDI2. In illustrative FIG. 2, the second TDI image sensor TDI2 is secured on or in a barrel 52 of the housing 50. An X-adjustment set screw 54 enables adjustment of the position of the second TDI image sensor TDI2 along the X direction. In one nonlimiting illustrative mechanism, this could be by way of coupling of the X-adjustment set screw 50 to the barrel 52 to enable precise adjustment of the position of the barrel 52 (and the second TDI image sensor TDI2 attached thereto) relative to the housing 50 along the X direction. Likewise, a Y-adjustment set screw 56 enables adjustment of the position of the second TDI image sensor TDI2 along the Y direction. In one nonlimiting illustrative mechanism, this could be by way of coupling of the Y-adjustment set screw 56 to the barrel 52 to enable precise adjustment of the position of the barrel 52 (and the second TDI image sensor TDI2 attached thereto) relative to the housing 50 along the Y direction. These X shift and Y shift adjustments are indicated in FIG. 2 by double-headed "X" and "Y" arrows. Additionally, the second TDI image sensor assembly has a mechanism to rotate the second TDI image sensor TDI2 about its central axis 58. In one nonlimiting illustrative mechanism, this could be by way of mounting the housing 50 to a rotatable shaft 60 so that rotation of the shaft 60 rotates the housing 50 and hence also the second TDI image sensor TDI2 to implement the rotation adjustment.

With continuing reference to FIG. 2 and with reference also back to FIG. 1, As previously noted both TDI image sensor assemblies 30 and 32 can have the same construction as that shown in FIG. 2 for TDI image sensor assembly 32. In FIG. 1, the TDI image sensor assemblies 30 and 32 are represented in simplified form with only the respective TDI image sensors TDI1 and TDI2 along with the housing 50, barrel 52, X-adjustment set screw 54 and Y-adjustment set screw 56 labeled for each image sensor assembly. (Note that the Y-adjustment set screws 56 are viewed on-end in FIG. 1).

In a fully manual calibration (for example after replacement of one of the assemblies), a user would typically adjust the rotation of the replaced TDI image sensor about its central axis 58 (for example by rotation of the shaft 60) to align the X and Y shift directions of the replaced TDI image sensor with the corresponding X and Y translation directions of the translation stage 14. This typically takes on the order of an hour or so. Next, the user would calibrate the X and Y shifts. In one approach, one TDI image sensor assembly has its X and Y shifts fixed using the X- and Y-adjustment set screws 54 and 56 of that TDI image sensor assembly. Then, the X shift of the other TDI image sensor is iteratively and incrementally adjusted by user adjustment of the X- and Y-adjustment set screws 54 and 56 of the other TDI image sensor assembly to align the TDI image sensor of that assembly with the first TDI image sensor. After each adjustment, the X shift is then measured by acquiring TDI images using both TDI image sensor assemblies 30 and 32 and determining the remaining X shift from those images. A further adjustment of the X-adjustment set screw 54 is then made, and this process is repeated until the X shift is within specification. In some embodiments, the TDI images have a pixel size along the X shift direction, and the specification is that the shift between the TDI images along the X shift direction should be less than the pixel size along the X shift direction. Thereafter, the Y shift is calibrated in using the same procedure, with the specification in some embodiments being that the shift between the TDI images along the Y shift direction should be less than the pixel size along the Y shift direction.

In the fully manual calibration, the calibration of the X and Y shifts is tedious, and can take on the order of six hours to complete. Additionally, the user accesses the set screw 54 or 56 in each iteration, which creates a significant possibility that the user may inadvertently come into contact with parts of the mask inspection system and potentially knock a part out of alignment or damage a part.

With continuing reference to FIG. 1, the illustrative mask inspection system substantially reduces the calibration time by automating the calibration of the X and Y shifts. This also reduces likelihood of inadvertent damage to the mask inspection system while accessing the set screws 54 and 56 during manual calibration. To this end, at least one of the TDI image sensor assemblies (specifically, the second TDI image sensor assembly 32 in illustrative FIG. 1) is provided with a first motor 70 connected to operate the X-adjustment set screw 54, and a second motor 72 connected to operate the Y-adjustment set screw 56. The hardware processor 40 is further programmed to implement an X/Y shift calibration controller 74 to control the first and second motors 70 and 72 to perform automated calibration of the X and Y shifts using feedback provided by the image processor 41. In some embodiments, the X/Y shift calibration controller 74 includes a proportional-integral-derivative (PID) controller 76 for controlling the motors 70 and 72. In illustrative FIG. 1, a single hardware processor 40 (e.g., microprocessor or microcontroller) implements both the image processor 41 and the X/Y shift calibration controller 74; however, in other embodiments the image processor 41 and the X/Y shift calibration controller 74 may be implemented by different hardware processors that are operatively connected to transfer image analysis results from the image processor 41 to the X/Y shift calibration controller 74.

Figure 3:
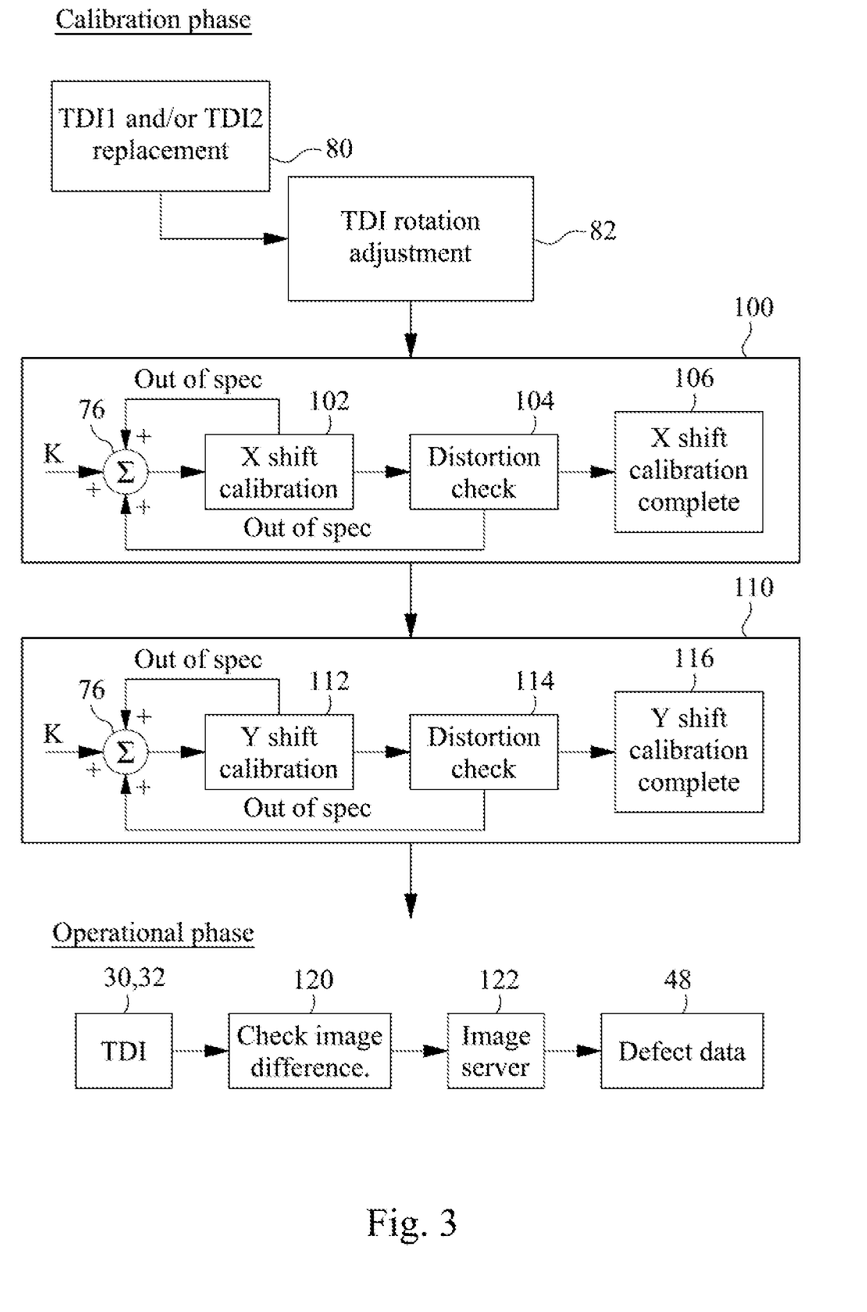
FIG. 3 diagrammatically illustrates calibration and operational phases of a TDI mask inspection system including automatic calibration of X and Y shifts.

With continuing reference to FIG. 1 and with further reference now to FIG. 3, calibration and operational phases of a mask inspection system such as that shown in FIG. 1 is diagrammatically shown, including automatic calibration of X and Y shifts. In an operation 80, one of the TDI image sensors (e.g. first TDI image sensor TDI1 and/or second TDI image sensor TDI2) is replaced. Typically (although not necessarily), this will entail replacing the corresponding TDI image sensor assembly 30 and/or 32. In an operation 82, the rotational orientation of the replaced TDI image sensor (or sensors) is adjusted, for example using the shaft 60 as previously described with reference to FIG. 2, so that the X and Y orientations of the TDI image sensor align with the X and Y translation directions of the translation stage 14. This rotation calibration may be done manually, or in another embodiment may be done by the hardware processor 40 using a suitable PID or other controller (not shown) receiving as input images acquired and analyzed by the image processor 41.

After the rotation calibration 82, an automated X shift calibration 100 is performed. This entails an iterative feedback process diagrammatically shown in FIG. 3 and suitably performed by the X/Y shift calibration controller 74 of FIG. 1. In the feedback control loop, the PID controller 76 receives as inputs a constant input denoted as "K" in FIG. 3, along with a feedback error signal indicative of the shift of the second TDI image acquired by the second TDI image sensor TDI2 respective to the first TDI image acquired by the first TDI image sensor TDI1 along the X shift direction and that controls the X-adjustment motor 70 based on the feedback error signal. The output of the PID controller 76 is a control signal that operates the X-adjustment motor 70 to perform the X shift calibration in an operation 102. A first TDI image is acquired using the first TDI image sensor TDI1 and a second TDI image is acquired using the second TDI image sensor TDI2. These images may in some embodiments be acquired simultaneously, for example using a reference mask or dummy mask mounted on the translation stage 14 as an imaging target.

Figure 4:
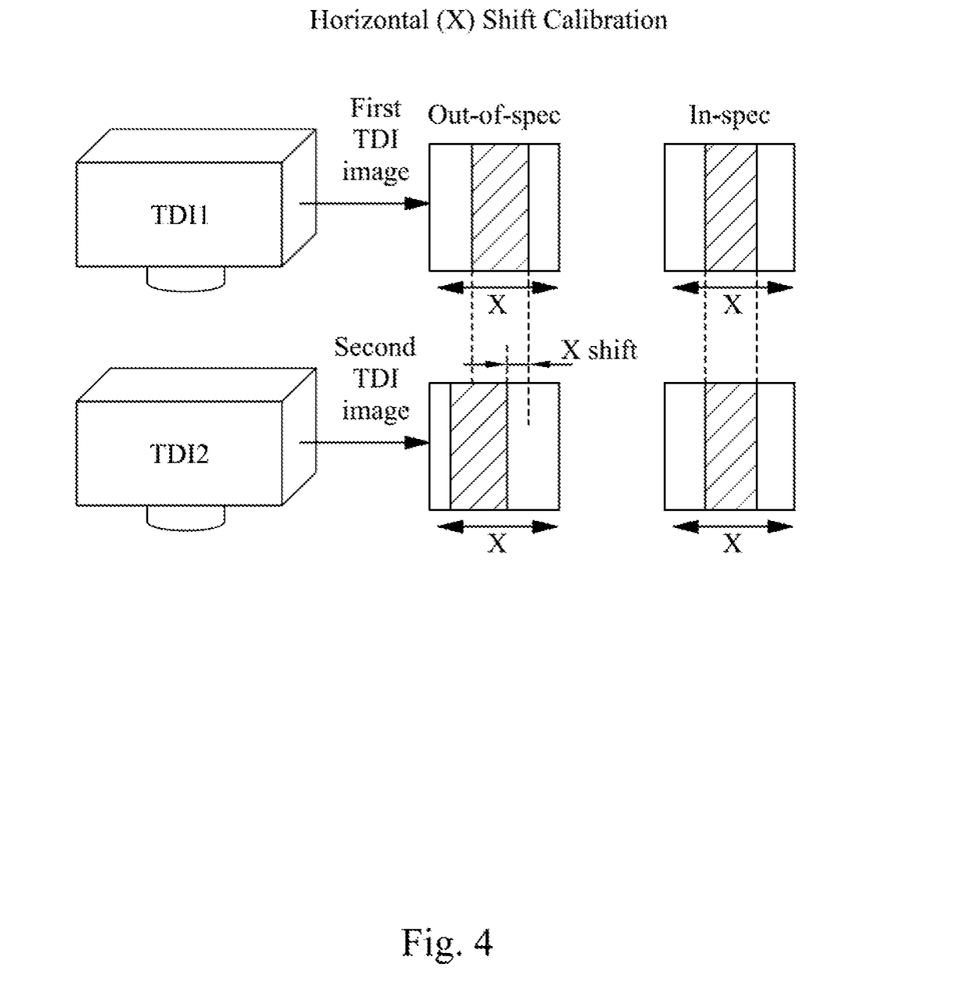
FIG. 4 diagrammatically illustrates examples of an X-shift that is out of specification ("out-of-spec") versus within specification ("in-spec").

With brief reference to FIG. 4, the feedback error signal may be an X shift determined by comparing the first TDI image acquired by the first TDI image sensor with the second TDI image acquired by the second TDI image sensor. FIG. 4 shows an "Out of spec" example in which there is an unacceptably large (i.e. out of specification) X shift between the two images; as well as an "In-spec" example in which the X shift between the two images is within specification (e.g., within one pixel in some embodiments).

With reference back to FIG. 3, in some embodiments the feedback error signal may additionally or alternatively be produced by a distortion check 104 performed on the first and second TDI images acquired by the respective first and second TDI image sensors. The feedback error signal is fed back to the PID controller 76 which controls the X-adjustment set screw motor 70 to operate the X-adjustment set screw 54 of the second TDI image sensor assembly 32 to minimize the feedback error signal until the distortion check 104 confirms the X shift is within specification, at which point the X shift calibration is complete as indicated by block 106 of FIG. 3.

After the X shift calibration 100 is complete, an automated Y shift calibration 110 is similarly performed. This entails an iterative feedback process diagrammatically shown in FIG. 3 and again suitably performed by the X/Y shift calibration controller 74 of FIG. 1. In the feedback control loop, the PID controller 76 receives as inputs the constant "K" along with a feedback error signal indicative of the shift of the second TDI image acquired by the second TDI image sensor TDI2 respective to the first TDI image acquired by the first TDI image sensor TDI1, but now along the Y shift direction. The PID controller 76 controls the Y-adjustment motor 72 based on the feedback error signal. The output of the PID controller 76 for the Y shift calibration 110 is a control signal that operates the Y-adjustment motor 72 to perform the Y shift calibration in an operation 112. A first TDI image is acquired using the first TDI image sensor TDI1 and a second TDI image is acquired using the second TDI image sensor TDI2. These images may in some embodiments be acquired simultaneously, for example using the reference mask or dummy mask mounted on the translation stage 14 as the imaging target. The error feedback signal may be a Y shift determined by comparing the first and second TDI images analogously to the approach described for the X shift calibration with reference to FIG. 4. In some embodiments, the feedback error signal for the Y shift calibration 110 may additionally or alternatively be produced by a distortion check 114 performed on the first and second TDI images acquired by the respective first and second TDI image sensors. The feedback error signal is fed back to the PID controller 76 which for the Y shift calibration 110 controls the Y-adjustment set screw motor 72 to operate the Y-adjustment set screw 56 of the second TDI image sensor assembly 32 to minimize the feedback error signal until the distortion check 114 confirms the Y shift is within specification, at which point the Y shift calibration is complete as indicated by block 116 of FIG. 3.

It should be noted that while FIG. 3 illustrates the X shift calibration being performed first followed by the Y shift calibration 110, the order can be reversed, e.g. the Y shift calibration 110 could instead be performed first followed by the X shift calibration 100.

With continuing reference to FIG. 3, upon completion of the calibration operations 82, 100, and 110 the mask inspection system is calibrated. It can then be used in an operational phase to inspect a mask for mask defects. To this end, as shown at the bottom of FIG. 3, the first and second TDI image sensors TDI1 and TDI2 are used to simultaneously acquire a first TDI inspection image of a mask 16 that is being moved by the translation stage 14 to implement time delay and integration imaging. In an operation 120, the image processor 41 then performs mask defect identification on the first and second TDI inspection images to identify mask defect data, for example by comparing the acquired TDI inspection images with the reference mask image(s) 42 as previously described. The identified mask defect data 48 may be uploaded to an image server 122 (e.g. implemented as the non-transitory storage medium 44 of FIG. 1) and/or presented on the display 46 or otherwise utilized.

Figure 5:
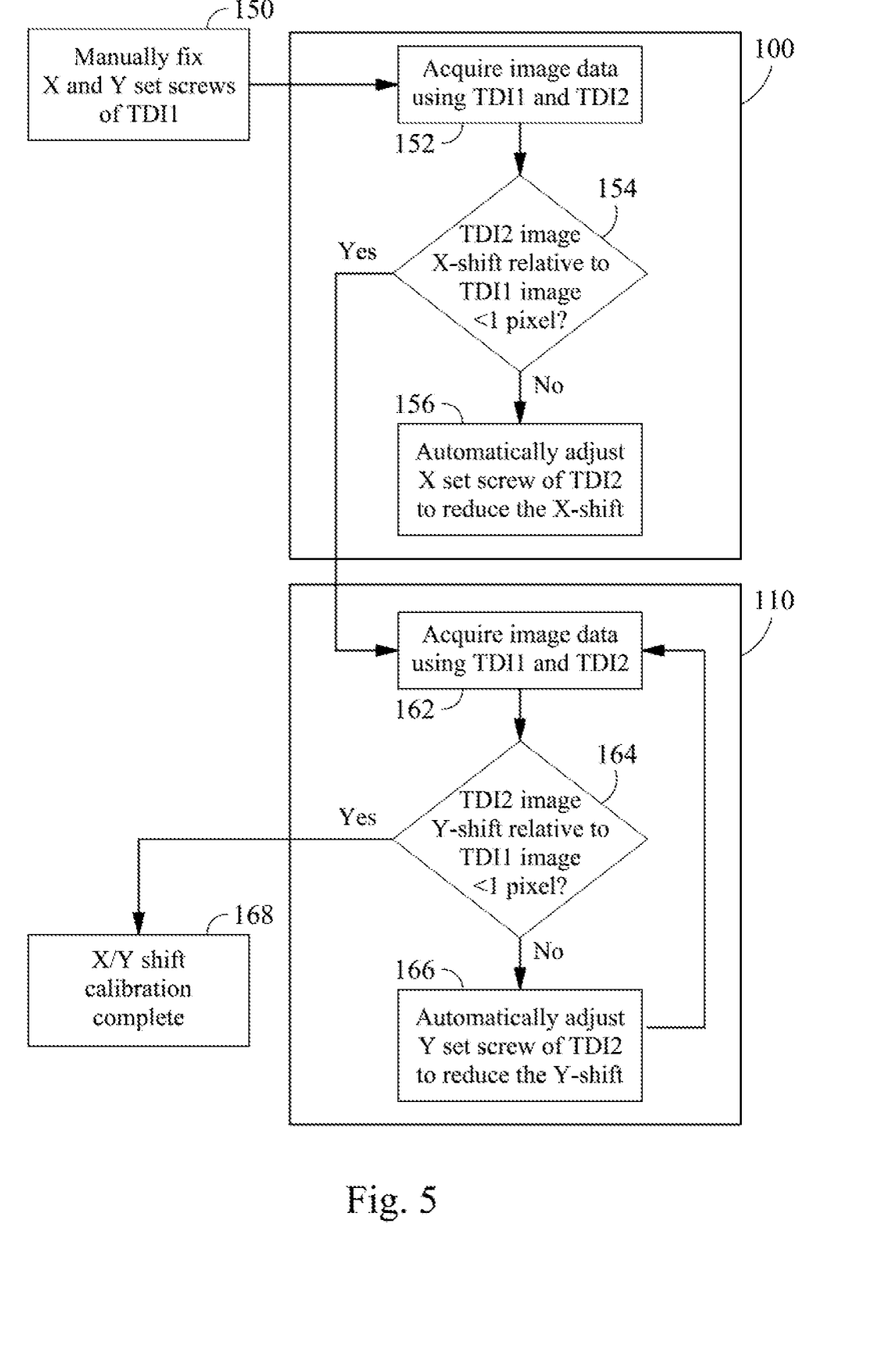
FIG. 5 diagrammatically illustrates a method of performing automated calibration of X and Y shifts of a TDI mask inspection system including automatic calibration of X and Y shifts.

With reference now to FIG. 5, an embodiment of the X shift and Y shift calibrations 100 and 110 of FIG. 3 are shown by way of a flowchart. In an initial operation 150, the X-adjustment and Y-adjustment set screws 54 and 56 of the first TDI image sensor assembly 30 are set to fixed positions. This is the only adjustment of the set screws of the first TDI image sensor assembly 30, because the X shift and Y shift calibrations 100 and 110 will align the image acquired by the second TDI image sensor assembly 32 to the image acquired by the first TDI image sensor assembly 30.

The X shift calibration then commences with an initial iteration of an operation 152 in which image data are acquired using the first and second TDI image sensors TDI1 and TDI2. For example, this may entail simultaneously acquiring a first TDI image using the first TDI image sensor TDI1 and a second TDI image using the second TDI image sensor TDI2. These images may for example be acquired for a reference mask or other calibration target mounted on the translation stage 14 and moved during the image acquisition to implement time delay and integration imaging. In an operation 154, the image data acquired in the operation 152 are analyzed to determine the X shift of the image acquired by the second TDI image sensor TDI2 relative to the image acquired by the first TDI image sensor TDI1. If the determined X shift is not within specification (e.g., if the X shift is not less than one pixel in the illustrative example of FIG. 5) then flow passes to an operation 156 which automatically adjusts the X-adjustment set screw 54 of the second TDI image sensor assembly 32 using the X set screw motor 70 to reduce the X shift. This may for example be done by the PID controller 76, although other automated approaches are also contemplated, such as using a proportional-integral (PI) controller, using a proportional-derivative (PD) controller, another type of feedback controller, or so forth. Flow then passes back to operation 152 to repeat this process until the analysis/decision operation 154 determines that a stopping criterion is met, e.g. the X shift is now within specification. This completes the X shift calibration 100.

Flow then passes to the Y shift calibration 110 which commences with an initial iteration of an operation 162 in which image data are acquired using the first and second TDI image sensors TDI1 and TDI2. For example, this may entail simultaneously acquiring a first TDI image using the first TDI image sensor TDI1 and a second TDI image using the second TDI image sensor TDI2, for example images of a moving reference mask or other calibration target mounted on the translation stage 14. In an operation 164, the image data acquired in the operation 162 are analyzed to determine the Y shift of the image acquired by the second TDI image sensor TDI2 relative to the image acquired by the first TDI image sensor TDI1. If the determined Y shift is not within specification (e.g., if the Y shift is not less than one pixel in the illustrative example of FIG. 5) then flow passes to an operation 166 which automatically adjusts the Y-adjustment set screw 56 of the second TDI image sensor assembly 32 using the Y set screw motor 72 to reduce the Y shift. This may for example be done by the PID controller 76, or by another automated approach such as using a PI controller, a PD controller, another type of feedback controller, or so forth. Flow then passes back to operation 162 to repeat this process until the analysis/decision operation 164 determines that a stopping criterion is met, e.g. the Y shift is now within specification. This completes the Y shift calibration 110, as indicated by block 168 of FIG. 5.

In the following, some further embodiments are described.

In a nonlimiting illustrative embodiment, a method is disclosed of calibrating a mask inspection system that employs time delay and integration (TDI) imaging. The method comprises: (i) simultaneously acquiring a first TDI image using a first TDI image sensor of the mask inspection system and a second TDI image using a second TDI image sensor of the mask inspection system, the first TDI image sensor being configured to acquire the first TDI image with light of a first polarization and the second TDI image sensor being configured to acquire the second TDI image with light of a second polarization that is orthogonal to the first polarization; (ii) adjusting a position of the second TDI image sensor using a motor, an amount of the adjustment being based on a shift of the second TDI image respective to the first TDI image along a shift direction; and (iii) repeating the operations (i) and (ii) until a stopping criterion is met.

In a nonlimiting illustrative embodiment, a method is disclosed of calibrating a mask inspection system that employs TDI imaging. The method comprises iteratively repeating, until a stopping criterion is met: (i) simultaneously acquiring first and second TDI images using respective first and second TDI image sensors of the mask inspection system, the first and second TDI image sensors being configured to acquire the respective first and second TDI images with light of mutually orthogonal polarizations, and (ii) automatically adjusting a position of the second TDI image sensor using an electronic controller that receives a feedback error signal indicative of the shift of the second TDI image respective to the first TDI image along the shift direction.

In a nonlimiting illustrative embodiment, a mask inspection system comprises: a translation stage; a first TDI image sensor configured to acquire TDI images with light of a first polarization; a second TDI image sensor configured to acquire TDI images with light of a second polarization that is orthogonal to the first polarization, the second TDI image sensor having a set screw for adjusting a position of the second TDI image sensor along a shift direction; and an electronic processor. The electronic processor is programmed to perform a mask inspection including (i) controlling the translation stage and the first and second image sensors to acquire first and second mask inspection images of an associated mask mounted on the translation stage while the associated mask is being moved by the translation stage, and (ii) analyzing the first and second mask inspection images to detect mask defects of the associated mask. The electronic processor is also programmed to perform a calibration of the mask inspection system including automatic feedback-controlled adjustment of the set screw of the second TDI image sensor using a feedback signal indicative of a shift along the shift direction of a second TDI image acquired using the second TDI image sensor respective to a first TDI image acquired by the first TDI image sensor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of calibrating a mask inspection system that employs time delay and integration (TDI) imaging, the method comprising:
   (i) simultaneously acquiring a first TDI image using a first TDI image sensor of the mask inspection system and a second TDI image using a second TDI image sensor of the mask inspection system, the first TDI image sensor being configured to acquire the first TDI image with light of a first polarization and the second TDI image sensor being configured to acquire the second TDI image with light of a second polarization that is orthogonal to the first polarization;
   (ii) adjusting a position of the second TDI image sensor by adjusting a set screw of the second TDI image sensor using a motor controlled by an electronic controller, an amount of the adjustment being based on a shift of the second TDI image respective to the first TDI image along a shift direction, wherein the electronic controller receives a feedback error signal indicative of the shift of the second TDI image respective to the first TDI image along the shift direction and controls the motor based on the feedback error signal; and
   (iii) repeating the operations (i) and (ii) until a stopping criterion is met and then stopping the operation (ii).

2. The method of claim 1, wherein the electronic controller comprises a proportional-integral-derivative (PIO) controller.

3. The method of claim 1, wherein:
   the first and second TDI images comprise pixels having a pixel size along the shift direction; and
   the stopping criterion comprises the shift of the second TDI image respective to the first TDI image along the shift direction being less than the pixel size along the shift direction.

4. The method of claim 1, further comprising, prior to a first iteration of the operations (i) and (ii):
   adjusting a rotation of the first TDI image sensor; and
   adjusting a rotation of the second TDI image sensor.

5. The method of claim 1, wherein the operations (i), (ii), and (iii) are performed automatically without human input.

6. The method of claim 1, wherein the operation (i) includes:
   reflecting light from a moving calibration target; and
   using a beam splitter, simultaneously directing the reflected light to both the first and second TDI image sensors.

7. The method of claim 1, further comprising:
   (I) simultaneously acquiring a third TDI image using the first TDI image sensor and a fourth TDI image using the second TDI image sensor;
   (II) further adjusting the position of the second TDI image sensor using a second motor, an amount of the further adjustment being based on a shift of the fourth TDI image respective to the third TDI image along a second shift direction that is orthogonal to the shift direction; and
   (III) repeating the operations (I) and (II) until a second stopping criterion is met and then stopping the operation (II).

8. A mask inspection method comprising:
   calibrating the mask inspection system using the method of claim 1;
   after the calibrating, simultaneously acquiring a first TDI inspection image of a moving mask using the first TDI image sensor and a second TDI inspection image of the moving mask using the second TDI image sensor; and
   performing mask defect identification on the first and second TDI inspection images.

9. The method of claim 1, wherein the second TDI image sensor has a second set screw for adjusting a position of the second TDI image sensor along a second shift direction orthogonal to the shift direction.

10. The method of claim 1, wherein the first TDI image and the second TDI image are acquired of a mask being moved by a translation stage.

11. A method of calibrating a mask inspection system that employs time delay and integration (TOI) imaging, the method comprising: iteratively repeating, until a stopping criterion is met: (i) simultaneously acquiring first and second TOI images using respective first and second TOI image sensors of the mask inspection system, the first and second TOI image sensors being configured to acquire the respective first and second TOI images with light of mutually orthogonal polarizations, and (ii) automatically adjusting a position of the second TOI image sensor using an electronic controller that receives a feedback error signal indicative of the shift of the second TOI image respective to the first TOI image along the shift direction, wherein the automatic adjusting of the position of the second TOI image sensor comprises automatically adjusting a set screw of the second TOI image sensor controlled by the electronic controller;
   and stopping the adjusting of the position of the second TOI image sensor when the stopping criterion is met.

12. The method of claim 11, wherein the electronic controller comprises a proportional-integral-derivative (PID) controller.

13. The method of claim 11, wherein:
   the first and second TDI images comprise pixels having a pixel size along the shift direction; and
   the stopping criterion comprises the shift of the second TDI image respective to the first TDI image along the shift direction being less than the pixel size along the shift direction.

14. The method of claim 11, wherein the second TDI image sensor has a second set screw for adjusting a position of the second TDI image sensor along a second shift direction orthogonal to the shift direction.

15. A mask inspection system comprising:
   a translation stage;
   a first TDI image sensor configured to acquire TDI images with light of a first polarization;
   a second TDI image sensor configured to acquire TDI images with light of a second polarization that is orthogonal to the first polarization, the second TDI image sensor having a set screw for adjusting a position of the second TDI image sensor along a shift direction; and an electronic processor programmed to:
perform a mask inspection including (i) controlling the translation stage and the first and second image sensors to acquire first and second mask inspection images of an associated mask mounted on the translation stage while the associated mask is being moved by the translation stage, and (ii) analyzing the first and second mask inspection images to detect mask defects of the associated mask; and
perform a calibration of the mask inspection system including automatic feedback-controlled adjustment of the set screw of the second TDI image sensor using a feedback signal indicative of a shift along the shift direction of a second TDI image acquired using the second TDI image sensor respective to a first TDI image acquired by the first TDI image sensor.

16. The mask inspection system of claim 15, wherein:
the second TDI image sensor has a second set screw for adjusting a position of the second TDI image sensor along a second shift direction orthogonal to the shift direction; and
the electronic processor is programmed to perform the calibration further including automatic feedback-controlled adjustment of the second set screw of the second TDI image sensor using a second feedback signal indicative of a shift along the second shift direction of a fourth TDI image acquired using the second TDI image sensor respective to a third TDI image acquired by the first TDI image sensor.

17. The mask inspection system of claim 16, further comprising:
a motor operatively connected to adjust the set screw of the second TDI image sensor under control of the electronic processor; and
a second motor operatively connected to adjust the second set screw of the second TDI image sensor under control of the electronic processor.

18. The mask inspection system of claim 15, wherein the electronic processor is programmed to perform the automatic feedback-controlled adjustment of the set screw of the second TDI image sensor using a proportional-integral-derivative (PID) controller that controls the adjustment of the set screw based on the feedback signal.

19. The mask inspection system of claim 15, further comprising:
a light source; and
an optical train configured to direct light from the light source onto the translation stage and to transmit light reflected from the associated mask mounted on the translation stage to both the first and second TDI image sensors, the optical train including a beam splitter to split the light reflected from the associated mask to transmit to both the first and second TDI image sensors.

20. The mask inspection system of claim 15, wherein the electronic processor is programmed to analyze the first and second mask inspection images to detect the mask defects of the associated mask by comparing the first and second mask inspection images with a reference mask image.

* * * * *